(12) United States Patent
Subramanian (10) Patent No.: US 11,525,243 B2
(45) Date of Patent: Dec. 13, 2022

(54) IMAGE-BASED PRODUCTIVITY TRACKING SYSTEM

(71) Applicant: Caterpillar Inc., Peoria, IL (US)

(72) Inventor: Gautham Subramanian, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 446 days.

(21) Appl. No.: 16/571,996

(22) Filed: Sep. 16, 2019

(65) Prior Publication Data

US 2021/0079627 A1 Mar. 18, 2021

(51) Int. Cl.

| | |
|---|---|
| *E02F 9/26* | (2006.01) |
| *G06F 16/58* | (2019.01) |
| *G06F 16/23* | (2019.01) |
| *G06F 16/29* | (2019.01) |
| *G07C 5/00* | (2006.01) |
| *G06V 20/13* | (2022.01) |

(52) U.S. Cl.
CPC .......... *E02F 9/261* (2013.01); *G06F 16/2322* (2019.01); *G06F 16/29* (2019.01); *G06F 16/5866* (2019.01); *G06V 20/13* (2022.01); *G07C 5/008* (2013.01)

(58) Field of Classification Search
CPC .. E02F 9/261; G06F 16/5866; G06F 16/2322; G06F 16/29; G06K 9/0063; G07C 5/008
See application file for complete search history.

(56) References Cited

U.S. PATENT DOCUMENTS

| | | | |
|---|---|---|---|
| 9,684,673 B2 | 6/2017 | Beckett et al. | |
| 2009/0278839 A1 | 11/2009 | Geis | |
| 2010/0257477 A1* | 10/2010 | Nielsen | G06K 9/00791 |
| | | | 715/771 |

(Continued)

FOREIGN PATENT DOCUMENTS

EP 3346347 A1 7/2018

OTHER PUBLICATIONS

Frank Warmerdam et al., "gdal2tiles", https://gdal.org/programs/gdal2tiles.html#gdal2tiles, Oct. 17, 2007, 5 pages.

(Continued)

*Primary Examiner* — James J Lee
*Assistant Examiner* — Steven Vu Nguyen
(74) *Attorney, Agent, or Firm* — Lee & Hayes, PLLC (57) ABSTRACT

A work machine including a sensing device, a user interface, and a control unit is disclosed. The control unit may be configured to generate a productivity layer based on productivity data, and generate an image layer based on image data. The image data may include information relating to an image corresponding to a state of an operation associated with a worksite and a geospatial reference associated with the image. The control unit may be configured to generate a composite image of the worksite based on a map layer, the image layer, and the productivity layer, and cause the composite image to be displayed via the user interface. The composite image may position the image layer relative to the map layer based on the geospatial reference and geographical coordinates corresponding to the geospatial reference, and position the productivity layer relative to the image layer.

16 Claims, 4 Drawing Sheets

(56) References Cited

U.S. PATENT DOCUMENTS

2010/0332552 A1* 12/2010 Taber .................. G06F 16/29
707/802
2015/0310360 A1   10/2015 Currin
2018/0196438 A1*  7/2018 Newlin ................ G05D 1/101
2018/0230671 A1*  8/2018 Wu ..................... E02F 9/265
2019/0100310 A1   4/2019 Flood
2019/0162551 A1*  5/2019 Kean ................. G06K 9/00671

OTHER PUBLICATIONS

MapTiler, "Build your own maps", https://www.maptiler.com/, Aug. 14, 2008, 8 pages.

* cited by examiner

IMAGE-BASED PRODUCTIVITY TRACKING SYSTEM

TECHNICAL FIELD

The present disclosure relates generally to surveying a worksite and, for example, to an image-based productivity tracking system for a worksite.

BACKGROUND

A worksite may include one or more work machines that are each individually operated to perform a task and collectively managed to complete an operation according to a site plan. The operation may relate to construction, paving, demolition, mining, landscaping, forestry, pipelining, and/or another industrial application. The site plan may include specifications of the operation to be performed at the worksite that are designed based on an initial or a prior survey of the worksite. In some cases, a tracking tool may be used to track a progress of the operation relative to the site plan. The tracking tool may be updated based on changes in survey data (e.g., relating to structural and/or geographical changes within the worksite), productivity data (e.g., relating to a location and/or an operating state of a work machine within the worksite), and/or other information that can be used to track the progress. In some cases, the tracking tool may provide a digital map and/or model of the worksite that can be used to guide operators of work machines. For instance, the tracking tool may be made accessible to remote operators and/or local operators via a mobile device, a control station, a display within a work machine, and/or another user interface.

In some cases, the tracking tool may provide a map view with an image of the worksite indicating respective locations of a work machine, a stockpile, and/or another asset or attribute associated with the worksite. The respective locations of the assets and/or attributes within the worksite may be updated based on productivity data that is obtained and/or derived from information provided by the work machines. However, images used to depict the worksite may be outdated (e.g., based on outdated satellite images), which can be inaccurate and/or misleading to an operator relying on the tracking tool. In some cases, an operator may use a drone with an imaging device to survey a worksite. For example, a drone can be used to capture an updated image of the worksite that can be used by the operator to assess visual changes to the worksite. However, information provided via a drone cannot be used in conjunction with information provided by a tracking tool (e.g., productivity data from work machines). Accordingly, an operator may need to separately analyze information provided via a tracking tool and information provided via a drone in order to assess a state of a worksite. Using separate systems to analyze a single operation may result in errors, delays, and inefficient use of work machines, computational resources, and/or network resources.

One attempt to generate aerial images that are encoded with metadata is disclosed in U.S. Pat. No. 9,684,673, by Beckett et al., filed on Dec. 4, 2013 ("the '673 patent"). The '673 patent discloses systems and methods for processing observation data, and images and metadata that are obtained from Earth observation platforms, including satellites or aircraft. The '673 patent discloses obtaining images and metadata associated with the images, encoding the images and the metadata to generate encoded tiles, storing the encoded tiles in an encoded tiles database, receiving a request for a map tile, obtaining the encoded tiles that are relevant to the request, merging data from the encoded tiles into the map tile, and outputting the map tile. However, the '673 patent does not disclose obtaining productivity data relating to one or more work machines of a worksite, generating a composite image that incorporates such productivity data into an image layer and a map layer, or determining a progress of an operation of a worksite based on such a composite image.

An image-based productivity tracking system of the present disclosure solves one or more of the problems set forth above and/or other problems in the art.

SUMMARY

According to some implementations, a method may include receiving, by a device, map data associated with a worksite, the map data including information relating to a geographical attribute associated with the worksite and geographical coordinates associated with the geographical attribute; receiving, by the device, productivity data associated with the worksite, the productivity data including information relating to a state of an operation associated with the worksite; receiving, by the device, image data associated with the worksite, the image data including information relating to an image corresponding to the state of the operation and a geospatial reference associated with the image; generating, by the device, a map layer based on the map data; generating, by the device, an image layer based on the image data; generating, by the device, a productivity layer based on the productivity data; generating, by the device, a composite image of the worksite based on the map layer, the image layer, and the productivity layer, the composite image positioning the image layer relative to the map layer based on the geospatial reference and geographical coordinates corresponding to the geospatial reference, and positioning the productivity layer relative to the image layer; and causing, by the device, an action to be performed based on the composite image.

According to some implementations, a device may include one or more memories; and one or more processors, communicatively coupled to the one or more memories, configured to receive productivity data associated with a worksite, the productivity data including information relating to a state of an operation associated with the worksite; receive image data associated with the worksite, the image data including information relating to an image corresponding to the state of the operation and a geospatial reference associated with the image; generate an image layer based on the image data; generate a productivity layer based on the productivity data; generate a composite image of the worksite based on a map layer, the image layer, and the productivity layer, the map layer including information relating to a geographical attribute associated with the worksite and geographical coordinates associated with the geographical attribute, and the composite image positioning the image layer relative to the map layer based on the geospatial reference and geographical coordinates corresponding to the geospatial reference, and positioning the productivity layer relative to the image layer; and cause an action to be performed based on the composite image.

According to some implementations, a work machine may include a sensing device configured to provide productivity data of the work machine, the productivity data including information relating to a state of an operation associated with a worksite; a user interface configured to display information relating to the state of the operation to an operator of the work machine; and a control unit in communication with the sensing device and the user interface, the control unit being configured to generate a productivity layer based on the productivity data, generate an image layer based on image data, the image data including information relating to an image corresponding to the state of the operation and a geospatial reference associated with the image, generate a composite image of the worksite based on a map layer, the image layer, and the productivity layer, the map layer including information relating to a geographical attribute associated with the worksite and geographical coordinates associated with the geographical attribute, and the composite image positioning the image layer relative to the map layer based on the geospatial reference and geographical coordinates corresponding to the geospatial reference, and positioning the productivity layer relative to the image layer, and cause the composite image to be displayed via the user interface.

DETAILED DESCRIPTION

Figure 1:
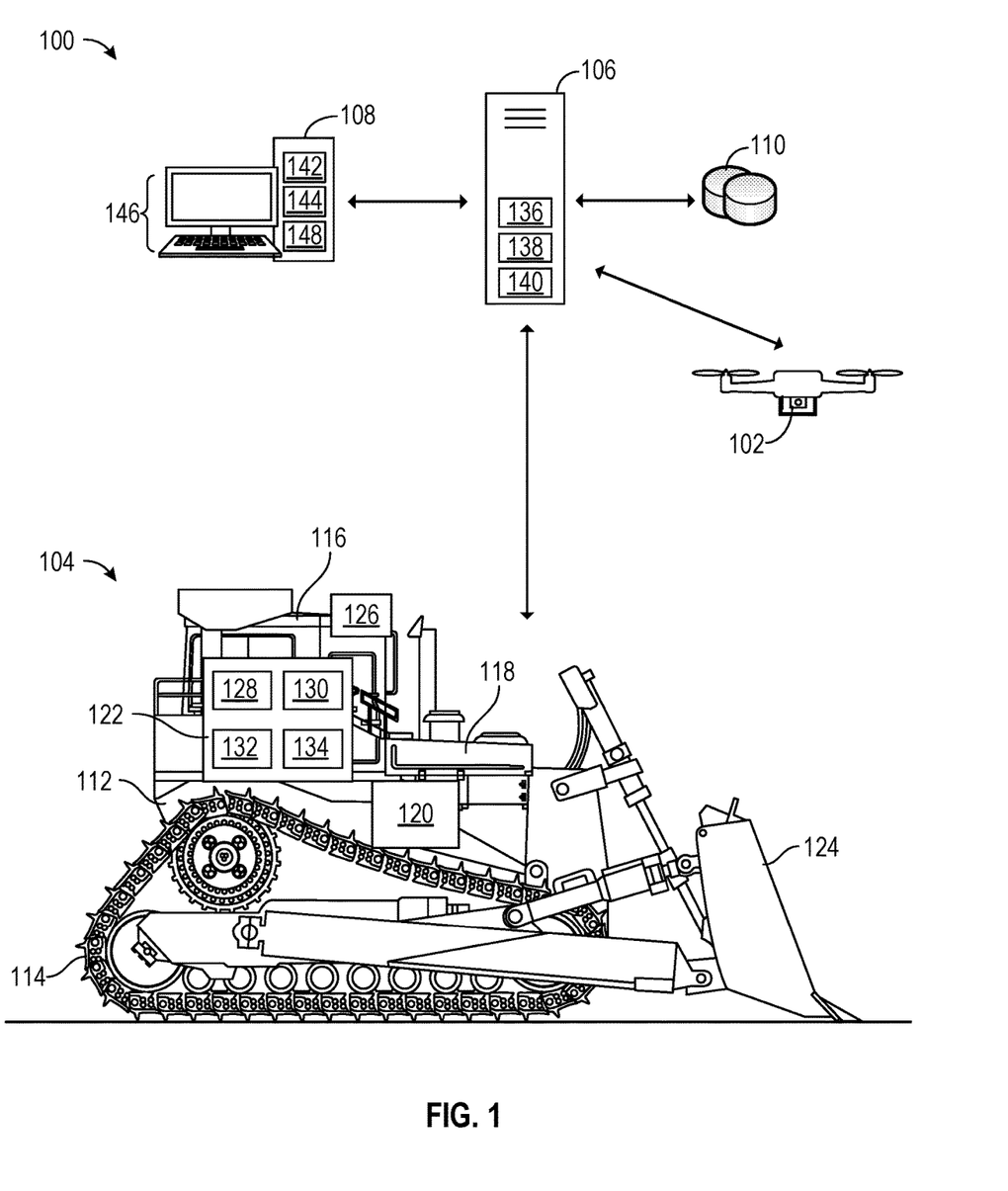
FIG. 1 is a diagram of an example image-based productivity tracking system described herein.

FIG. 1 is a diagram of an example image-based productivity tracking system 100 described herein. As shown in FIG. 1, productivity tracking system 100 may include an imaging device 102, a work machine 104, a management platform 106, a control station 108, a network storage device 110, and/or another device configured to facilitate an operation being performed at a worksite. Productivity tracking system 100 may be used to track a progress of the operation relative to a site plan. Work machine 104 may include a dozer, a tractor, a loader, a truck, a motor grader, an excavator, a paver, and/or another work machine 104 configured to perform a task associated with the operation. The operation may relate to construction, paving, demolition, mining, landscaping, forestry, pipelining, and/or another industrial application. The site plan may be designed based on an initial or a prior survey of the worksite and include a specification of the operation to be performed (e.g., a target work path, a target cut depth, a target grade, a target mat thickness, a target volume of material to be extracted, placed, and/or transported, and/or another specification of the operation that may be provided with varying degrees of granularity).

In some implementations, productivity tracking system 100 may provide and/or support a productivity tracking service that receives information relating to an operation at a worksite, determines a state of the operation, and provides a progress of the operation to an operator associated with the worksite. In some examples, productivity tracking system 100 may provide information relating to the progress of the operation in a form of a digital model (e.g., a two-dimensional digital model and/or a three-dimensional digital model) of the worksite. The digital model may be generated using a combination of image data (e.g., provided by imaging device 102) and productivity data (e.g., provided by work machine 104, management platform 106, control station 108, and/or network storage device 110) that are updated intermittently, periodically, and/or continuously in real-time. The productivity tracking service and/or information provided by the productivity tracking service may be made accessible to a local operator via a user interface of work machine 104 and/or a subscriber to the productivity tracking service (e.g., a remote operator, a site foreman, a supervisor, and/or the like) via control station 108 (e.g., a mobile device, a computer, and/or the like).

In some implementations, productivity tracking system 100 may include multiple imaging devices 102, multiple work machines 104, and/or multiple control stations 108 that interact with management platform 106 and/or network storage device 110. In some examples, productivity tracking system 100 may include multiple management platforms 106 and/or multiple network storage devices 110 that interact with one or more imaging devices 102, one or more work machines 104, and/or one or more control stations 108. Productivity tracking system 100 may be used with a manually operated work machine 104 and/or an autonomously or a semi-autonomously operated work machine 104. For example, productivity tracking system 100 may be used to guide, navigate, and/or control an autonomous or a semi-autonomous work machine 104 based on location data of work machine 104, coordinate data associated with the worksite associated with work machine 104, coordinate data associated with a site plan, and/or the like. In some examples, work machine 104 may receive guidance, navigation, and/or control information from a local operator, from a remote operator via control station 108, and/or from another device of productivity tracking system 100.

As further shown in FIG. 1, imaging device 102 includes a digital camera and/or the like that is configured to capture an image (e.g., a digital image and/or a digital video) of the worksite. As shown for the example in FIG. 1, imaging device 102 may be disposed on an unmanned aerial vehicle (e.g., a drone and/or the like) that is capable of traversing a worksite in one or more directions while generating image data (e.g., data relating to a digital image and/or a digital video captured by imaging device 102) associated with the worksite. Imaging device 102 and/or the unmanned aerial vehicle may be remotely controlled by an operator, and/or autonomously or semi-autonomously operated (e.g., based on a command and/or an instruction provided via work machine 104, management platform 106, control station 108, and/or network storage device 110). In some examples, imaging device 102 may be disposed on an unmanned ground vehicle, an unmanned surface vehicle, and/or another type of unmanned vehicle. In some examples, imaging device 102 may correspond to a hand-held digital camera, a digital camera of a mobile device (e.g., a smartphone, a tablet, a laptop, and/or the like), and/or another type of digital camera with sufficient pixel density and/or resolution for capturing an image of the worksite.

In some implementations, imaging device 102 may be configured to determine a geospatial reference to be associated with a captured image. For example, imaging device 102 and/or the unmanned aerial vehicle may include a global positioning system (GPS) device, a global navigation satellite system (GNSS) device, and/or another location sensing device configured to determine a location (e.g., geographical coordinates and/or the like) of imaging device 102 relative to the worksite. Imaging device 102 may determine a geospatial reference of a captured image based on the location of imaging device 102 at a time the image was captured. Imaging device 102 may generate image data based on the captured image, and embed or otherwise associate the geospatial reference with the image data.

Imaging device 102 may generate the image data using a geospatially tagged image file format (GeoTIFF), a LASer (LAS) file format, and/or another suitable file format that enables work machine 104, management platform 106, control station 108, and/or network storage device 110 to retrieve the image and the geospatial reference from the image data, and associate the image with a location relative to the worksite based on the geospatial reference.

As further shown in FIG. 1, work machine 104 includes a frame 112, traction elements 114, an operator cab 116, an engine 118, one or more sensing devices 120, and a control unit 122. Traction elements 114 may include wheels, tracks, and/or the like that are movably coupled to frame 112 and caused to be driven by engine 118 to propel work machine 104. Operator cab 116 may be coupled to frame 112 and configured to support an operator of work machine 104 and one or more components of control unit 122. Engine 118 may include a diesel engine, a gasoline engine, a natural gas engine, a hybrid engine, an electric motor, and/or another power source configured to drive traction elements 114 to propel work machine 104. In some examples, work machine 104 may include an implement 124 (e.g., a blade, a ripper, a winch, a bucket, a sheer, a hammer, and/or the like) that is movably coupled to frame 112 and configured to perform a task associated with work machine 104. In some examples, work machine 104 may include an onboard imaging device 126 (e.g., a digital camera and/or the like similar to imaging device 102) that is fixed to work machine 104 and configured to capture an image associated with the worksite, determine a geospatial reference associated with the image, generate image data based on the image, and embed the geospatial reference into or otherwise associate the geospatial reference with the image data.

Sensing devices 120 include a combination of a sensor, a switch, an encoder, and/or another device configured to provide productivity data (e.g., information relating to a productivity of work machine 104). For example, sensing devices 120 may be configured to provide information relating to an engine speed, a track or wheel speed, a travel speed, a trip length, a trip duration, a runtime, a fuel consumption rate, an engine temperature, a coolant temperature, and/or another operating state of work machine 104. In some examples, sensing devices 120 may include a GPS device, a GNSS device, and/or another location sensing device configured to provide a location of work machine 104 relative to the worksite. If sensing devices 120 include a location sensing device, a location of work machine 104 determined by sensing devices 120 may be used as a geospatial reference to be embedded or otherwise associated with image data generated by onboard imaging device 126. If work machine 104 includes an implement 124, sensing devices 120 may include a sensor, a switch, an encoder, and/or another device configured to provide information relating to an operating state of implement 124 (e.g., a cut depth, a cut length, a cut volume, a volume of material that is loaded or unloaded, and/or another operating state that can be used to determine a productivity of work machine 104).

Control unit 122 includes a processor 128, a memory 130, a user interface 132, and a communication device 134. Processor 128 is implemented in hardware, firmware, and/or a combination of hardware and software capable of being programmed to perform a function associated with work machine 104 and/or productivity tracking system 100. Memory 130 includes a random-access memory (RAM), a read only memory (ROM), and/or another type of dynamic or static storage device that stores information and/or instructions to be performed by processor 128. User interface 132 includes an input device and an output device. The input device may enable an operator of work machine 104 to specify an instruction, a command, and/or another operating parameter for operating work machine 104. The output device may enable an operator of work machine 104 to access an image of a worksite, access a site plan, monitor productivity data relating to an operation associated with work machine 104, monitor a state and/or a progress of an operation associated with work machine 104, track a location of work machine 104 relative to a worksite and/or another work machine 104, access a historic record associated with work machine 104, and/or the like.

Communication device 134 includes a wireless local area network (WLAN) component (e.g., a Wi-Fi component), a radio frequency (RF) communication component (e.g., a Bluetooth component), and/or the like. Communication device 134 may enable communication between work machine 104 and imaging device 102, management platform 106, control station 108, and/or network storage device 110. For example, communication device 134 may enable processor 128 to receive map data associated with a worksite, productivity data relating to an operation associated with work machine 104, and/or image data associated with a worksite from imaging device 102, management platform 106, control station 108, and/or network storage device 110. In some examples, communication device 134 may enable processor 128 to transmit productivity data associated with work machine 104 (e.g., determined via sensing devices 120) and/or image data associated with the worksite (e.g., generated by onboard imaging device 126) to management platform, control station 108, and/or network storage device 110. In some examples, control unit 122 may communicate with imaging device 102, control station 108, and/or network storage device 110 directly and/or indirectly via management platform 106.

As further shown in FIG. 1, management platform 106 includes a processor 136, a memory 138, and a communication device 140. Processor 136 is implemented in hardware, firmware, and/or a combination of hardware and software capable of being programmed to perform a function associated with work machine 104 and/or productivity tracking system 100. Memory 138 includes a RAM, a ROM, and/or another type of dynamic or static storage device that stores information and/or instructions to be performed by processor 136. Communication device 140 includes a WLAN component (e.g., a Wi-Fi component), an RF communication component (e.g., a Bluetooth component), a positioning component (e.g., a GPS component, a GNSS component), and/or the like. Communication device 140 may enable processor 136 to exchange map data associated with a worksite, productivity data relating to an operation associated with work machine 104, and/or image data associated with a worksite with imaging device 102, work machine 104, management platform 106, control station 108, and/or network storage device 110. In some examples, communication device 140 may enable map data, productivity data, and/or image data to be exchanged between imaging device 102, work machine 104, management platform 106, control station 108, and/or network storage device 110.

As further shown in FIG. 1, control station 108 includes a processor 142, a memory 144, a user interface 146, and a communication device 148. Processor 142 is implemented in hardware, firmware, and/or a combination of hardware and software capable of being programmed to perform a function associated with work machine 104 and/or productivity tracking system 100. Memory 144 includes a RAM, a ROM, and/or another type of dynamic or static storage device that stores information and/or instructions to be performed by processor 142. User interface 146 includes an input device and an output device. The input device may enable a remote operator of work machine 104 to specify an instruction, a command, and/or another operating parameter for operating work machine 104. The output device may enable a remote operator of work machine 104 to access an image of a worksite, access a site plan, monitor productivity data relating to an operation associated with work machine 104, monitor a state and/or a progress of an operation associated with work machine 104, track a location of work machine 104 relative to a worksite and/or another work machine 104, access a historic record associated with work machine 104, and/or the like.

Communication device 148 includes a wireless local area network (WLAN) component (e.g., a Wi-Fi component), a radio frequency (RF) communication component (e.g., a Bluetooth component), and/or the like. Communication device 148 may enable communication between control station 108 and imaging device 102, work machine 104, management platform 106, and/or network storage device 110. For example, communication device 148 may enable processor 142 to exchange map data associated with a worksite, productivity data relating to an operation associated with work machine 104, and/or image data associated with a worksite with imaging device 102, work machine 104, management platform 106, and/or network storage device 110. In some examples, communication device 148 may enable map data, productivity data, and/or image data to be exchanged between imaging device 102, work machine 104, management platform 106, and/or network storage device 110. In some examples, control station 108 may communicate with work machine 104 and/or network storage device 110 directly and/or indirectly via management platform 106. Additionally, or alternatively, control station 108 may serve as a user interface of management platform 106.

As further shown in FIG. 1, network storage device 110 includes one or more devices capable of storing, processing, and/or routing information. Network storage device 110 may include, for example, a server device, a device that stores a data structure, a device in a cloud computing environment or a data center, and/or the like. In some examples, network storage device 110 may include a communication interface that allows network storage device 110 to receive information from and/or transmit information to work machine 104, management platform 106, control station 108, and/or another device associated with productivity tracking system 100. In some examples, network storage device 110 may store information relating to work machine 104 and/or productivity tracking system 100. For example, network storage device 110 may be used to store map data associated with a worksite, productivity data relating to an operation associated with work machine 104, and/or image data associated with a worksite, and enable imaging device 102, work machine 104, management platform 106, and/or control station 108 to access the map data, the productivity data, and/or the image data.

As indicated above, FIG. 1 is provided as an example. Other examples may differ from what was described in connection with FIG. 1.

Figure 2A:
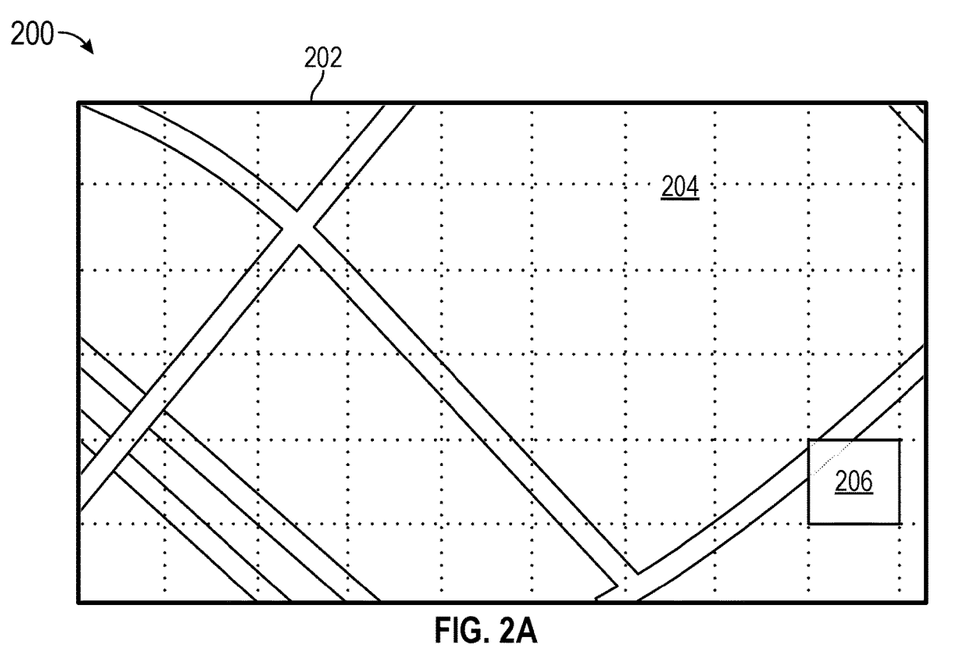
FIGS. 2A-2D are diagrams of an example implementation of an image-based productivity tracking system described herein.

FIGS. 2A-2D are diagrams of an example implementation 200 of productivity tracking system 100 described herein. As shown in FIG. 2A, productivity tracking system 100 (e.g., via control unit 122, management platform 106, and/or control station 108) may be configured to generate a map layer 202 based on map data associated with a worksite 204. The map data may include information relating to a geographical attribute associated with worksite 204 and geographical coordinates associated with the geographical attribute. For example, the map data may include geographical coordinates corresponding to a road leading to worksite 204, a boundary of worksite 204, a landmark associated with worksite 204, a fixed structure associated with worksite 204, a reference point associated with worksite 204, and/or another geographical reference that aids in identifying and/or defining a location of worksite 204. In some examples, map layer 202 may be generated using a grid of map tiles 206 that are obtained based on the map data. Map tiles 206 may provide visual representations of different geographical areas associated with worksite 204 that are arranged according to corresponding geographical coordinates.

In some implementations, productivity tracking system 100 may be configured to generate map layer 202 using a different arrangement of map tiles 206 than shown. For example, map layer 202 may be formed using a greater number of smaller map tiles 206 than shown or a fewer number of larger map tiles 206 than shown. In some examples, productivity tracking system 100 may adjust dimensions of individual map tiles 206 to vary a zoom level of map layer 202 and/or to vary a resolution of map layer 202. Additionally, or alternatively, productivity tracking system 100 may adjust pixel resolutions of individual map tiles 206 to vary the resolution of map layer 202. In some examples, map layer 202 may be formed using map tiles 206 that are arranged in a format that is different from a grid arrangement. The map data and/or corresponding map tiles 206 may be obtained from network storage device 110 and/or another resource that is accessible to productivity tracking system 100. In some examples, productivity tracking system 100 may be configured to adjust a view (e.g., a zoom level, a pan direction, and/or the like) of worksite 204 that is depicted via map layer 202 according to input received from an operator (e.g., via user interface 132 of work machine 104 and/or user interface 146 of control station 108).

Figure 2B:
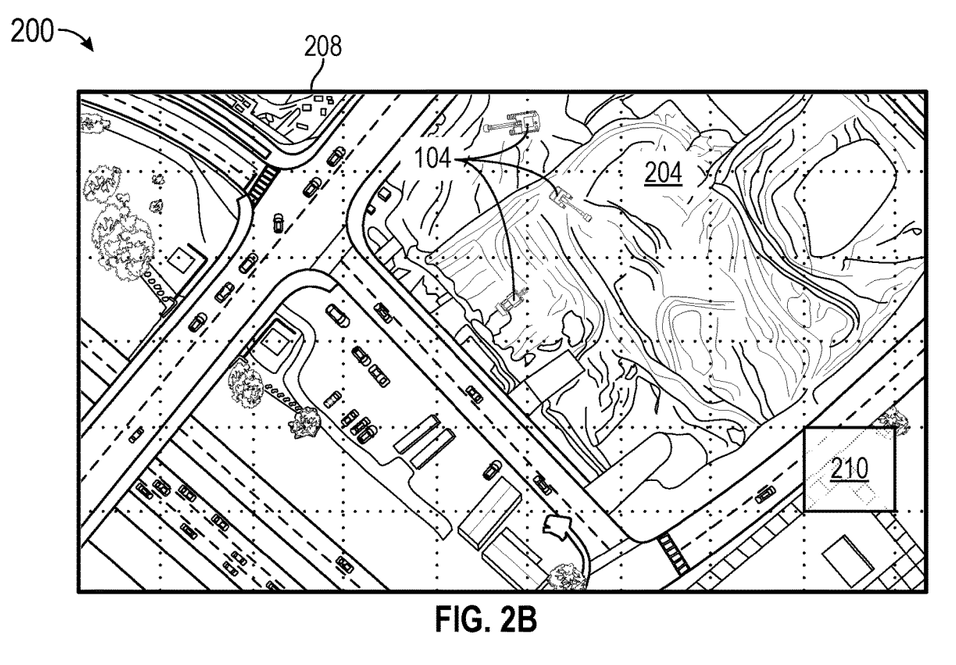

As shown in FIG. 2B, productivity tracking system 100 may be configured to generate an image layer 208 based on image data associated with worksite 204. The image data may include information relating to an image corresponding to a state of an operation being performed by work machine 104 at worksite 204 and a geospatial reference associated with the image. For example, the image may correspond a state of worksite 204 that is captured within a threshold period of time (e.g., range of seconds, minutes, hours, days, weeks, and/or the like), with a threshold degree of resolution of worksite 204, and/or another attribute of worksite 204. The image data may be received from imaging device 102 configured to capture the image, determine the geospatial reference associated with the image, generate the image data based on the image, and embed the geospatial reference into the image data. In some examples, the image data may be converted into a grid of image tiles 210 corresponding to the image. Image tiles 210 may depict sectional images of different geographical areas associated with worksite 204 that are arranged according to respective geospatial references. The grid of image tiles 210 may be sized and spatially arranged to correspond with the grid of map tiles 206. Although shown with an aerial view of worksite 204, image layer 208 may provide a different view of worksite 204 (e.g., a surface level view of worksite 204 using image data provided via onboard imaging device 126 of work machine 104).

In some implementations, productivity tracking system 100 may be configured to generate image layer 208 using a different arrangement of image tiles 210 than shown. Productivity tracking system 100 may adjust dimensions of individual image tiles 210 to vary a zoom level of image layer 208 and/or to vary a resolution of image layer 208. Additionally, or alternatively, productivity tracking system 100 may adjust pixel resolutions of individual image tiles 210 to vary the resolution of image layer 208. In some examples, image layer 208 may be formed using image tiles 210 that are arranged in a format that is different from a grid arrangement. Image layer 208 may be updated intermittently, periodically, and/or continuously in real-time. For example, productivity tracking system 100 (e.g., via control unit 122, management platform 106, and/or control station 108) may be configured to transmit a command signal to imaging device 102 and/or onboard imaging device 126 to capture an updated image associated with worksite 204, and generate updated image data based on the updated image. In some examples, productivity tracking system 100 may be configured to adjust a view of worksite 204 that is depicted via image layer 208 according to input received from an operator.

Figure 2C:
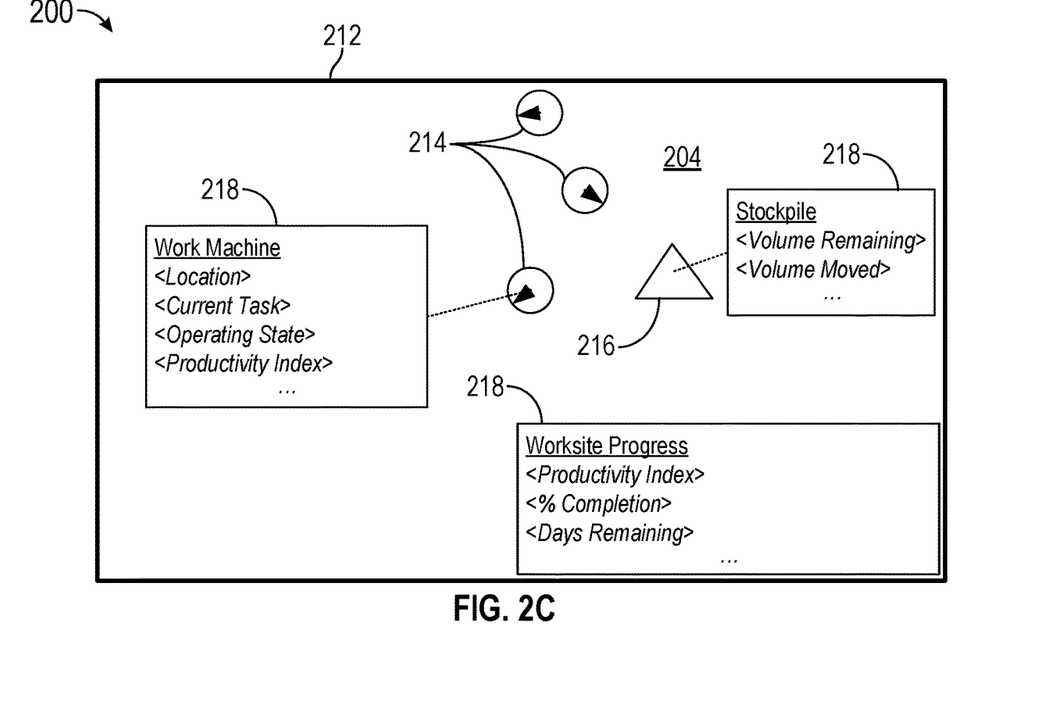

As shown in FIG. 2C, productivity tracking system 100 may be configured to generate a productivity layer 212 based on productivity data associated with worksite 204. The productivity data may include information relating to a state of an operation associated with worksite 204. The productivity data may be obtained via information provided via work machine 104 (e.g., sensing devices 120), management platform 106, control station 108, and/or network storage device 110. In some examples, the productivity data may be manually entered by an operator and/or derived based on an assessment of information relating to performance of work machine 104, a survey of worksite 204, and/or the like. For example, the productivity data may include information relating to a location of work machine 104, a task of work machine 104, an operating parameter of work machine 104, an operating state of work machine 104, a measurement associated with worksite 204, a location of a target work path associated with worksite 204, a location of a stockpile associated with worksite 204, a measurement of the stockpile, a progress of the operation relative to an associated site plan, and/or other information that can be used for tracking a progress of an operation. In some examples, the productivity data may include a productivity index (e.g., a rating, a score, and/or another metric for quantifying the productivity data).

In some implementations, productivity tracking system 100 may be configured to generate a visual indication (e.g., a symbol, an annotation, and/or the like) associated with the productivity data, and generate productivity layer 212 to include the visual indication. As shown for the example in FIG. 2C, productivity layer 212 may include a first symbol 214 that represents a location and/or a heading of work machine 104 relative to worksite 204, a second symbol 216 that represents a location of a stockpile within worksite 204, and/or the like. In some examples, productivity layer 212 may include an annotation 218 that provides information relating to work machine 104 (e.g., a location, a current task, an operating state, a productivity index of work machine 104, and/or the like), information relating to a stockpile (e.g., a volume of the stockpile remaining, a volume of the stockpile that has been moved, and/or the like), and/or information relating to overall progress of an operation (e.g., a general productivity index, a percentage of the operation that is complete relative to a site plan, a percentage of the operation that remains relative to a site plan, a number of days that has elapsed since the operation started, a number of days that remains until completion, and/or the like).

In some implementations, productivity tracking system 100 may be configured to update productivity layer 212 intermittently, periodically, and/or continuously in real-time. Productivity tracking system 100 may be configured to obtain updated productivity data (e.g., via control unit 122, management platform 106, and/or control station 108), and adjust a visual indication of the productivity layer 212 according to the updated productivity data. For example, a position and/or an orientation of first symbol 214 may be adjusted according to a change in a location and/or a heading of work machine 104, and contents of annotation 218 may be modified according to a change in a state or a progress of the operation. In some examples, productivity tracking system 100 may update productivity layer 212 and image layer 208 according to synchronized intervals, such that the productivity data is consistent with the image data. In some examples, productivity tracking system 100 may update image layer 208 based on a change detected in productivity layer 212, and/or update productivity layer 212 based on a change detected in image layer 208. Additionally, or alternatively, productivity tracking system 100 may be configured to adjust a view and/or content provided via productivity layer 212 according to operator input.

Figure 2D:
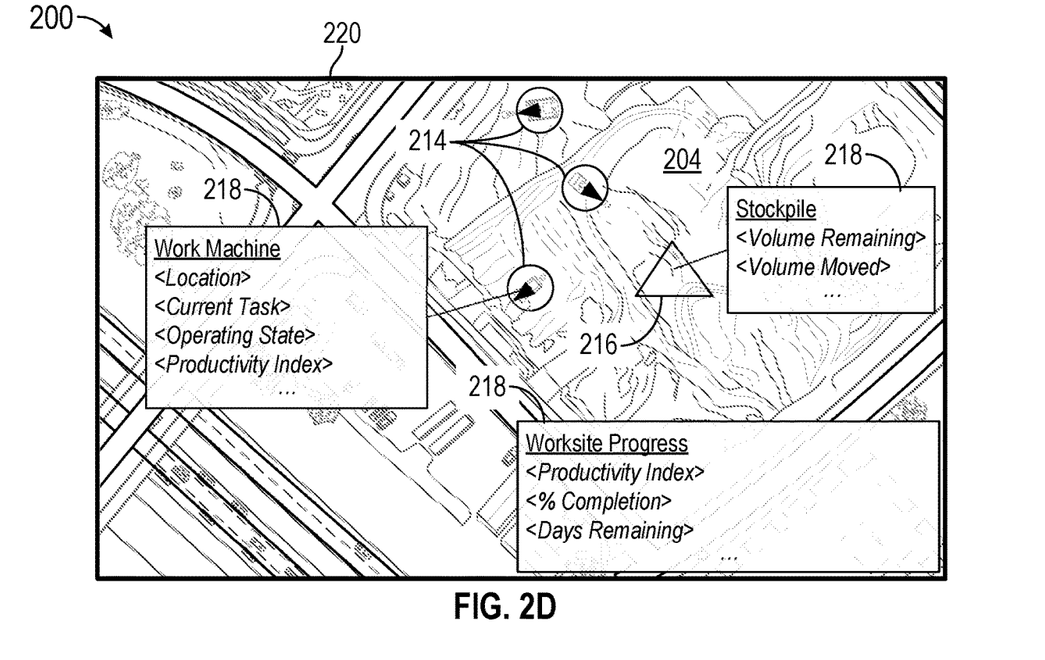

As shown in FIG. 2D, productivity tracking system 100 may be configured to generate a composite image 220 of worksite 204 based on map layer 202, image layer 208, and/or productivity layer 212. For example, productivity tracking system 100 may merge, overlay, superimpose, and/or otherwise position image layer 208 relative to map layer 202 such that a geospatial reference associated with image layer 208 corresponds to geographical coordinates associated with map layer 202. If map tiles 206 and image tiles 210 are used, a grid of image tiles 210 may be sized and spatially arranged to correspond to a grid of map tiles 206. In some examples, productivity tracking system 100 may merge, overlay, superimpose, and/or otherwise position productivity layer 212 relative to image layer 208 and/or map layer 202. If productivity layer 212 includes a visual indication relating to location information (e.g., first symbol 214 indicating a location of work machine 104, second symbol 216 indicating a location of a stockpile, and/or the like), the visual indication may be positioned at a corresponding geospatial reference of image layer 208 and/or at corresponding geographical coordinates of map layer 202, such that composite image 220 depicts a combination of information relating to map data, image data, and/or productivity data associated with worksite 204.

In some implementations, productivity tracking system 100 may be configured to update the composite image 220 intermittently, periodically, and/or continuously in real-time. For example, productivity tracking system 100 may modify image layer 208 based on updated image data, modify productivity layer 212 based on updated productivity data, and generate an updated composite image 220 with the modified image layer 208 and/or the modified productivity layer 212. Additionally, or alternatively, productivity tracking system 100 may generate a new image layer 208 based on updated image data and/or a new productivity layer 212 based on updated productivity data, and generate a new composite image 220 based on the new image layer 208 and/or the new productivity layer 212. In some examples, productivity tracking system 100 may enable an operator to interact with composite image 220 to adjust a view and/or content provided via composite image 220. For example, an operator may be able to adjust a zoom level, adjust a pan direction, modify a visual indication, display a different combination of layers, and/or the like.

In some implementations, productivity tracking system 100 may be configured to cause an action to be performed based on composite image 220. For example, productivity tracking system 100 may generate a record of successive composite images 220 of worksite 204 and respective timestamps of when the successive composite images 220 were generated. In some examples, productivity tracking system 100 may generate a catalog of successive composite images 220 that are indexed via respective timestamps, and store the catalog in network storage device 110 and/or another data structure that is accessible to an operator. For example, an operator may use the catalog to view a prior state of an operation at worksite 204. Additionally, or alternatively, an operator may use the catalog to compare successive composite images 220 and observe a progress of an operation at worksite 204 based on a change in state between the successive composite images 220. In some examples, productivity tracking system 100 may use a change detection model and/or another computer vision model to compare successive composite images 220, identify a visual difference between the successive composite images 220, and determine a state and/or a progress of an operation associated with worksite 204 based on the visual difference.

In some implementations, productivity tracking system 100 may be configured to transmit a command signal to imaging device 102 to capture an updated image associated with worksite 204, and generate updated image data based on the updated image. If imaging device 102 is an unmanned aerial vehicle, productivity tracking system 100 may transmit a command signal that causes imaging device 102 to deploy to a desired vantage point and/or traverse a desired path relative to worksite 204, and capture an updated image of worksite 204. Productivity tracking system 100 may automatically deploy imaging device 102 intermittently and/or at periodic intervals. Additionally, or alternatively, productivity tracking system 100 may instruct imaging device 102 to hover at a fixed location and continuously capture updated images of worksite 204 for a threshold duration of time. In some examples, productivity tracking system 100 may be configured to receive survey data relating to a site plan associated with worksite 204. Productivity tracking system 100 may generate a survey layer based on the survey data, and generate composite image 220 of worksite 204 based on the survey layer. For example, the survey layer may be positioned relative to map layer 202, image layer 208, and/or productivity layer 212 in a manner that enables an operator to visually observe a progress of an operation of worksite 204 relative to the site plan.

As indicated above, FIGS. 2A-2D are provided as an example. Other examples may differ from what is described in connection with FIGS. 2A-2D.

Figure 3:
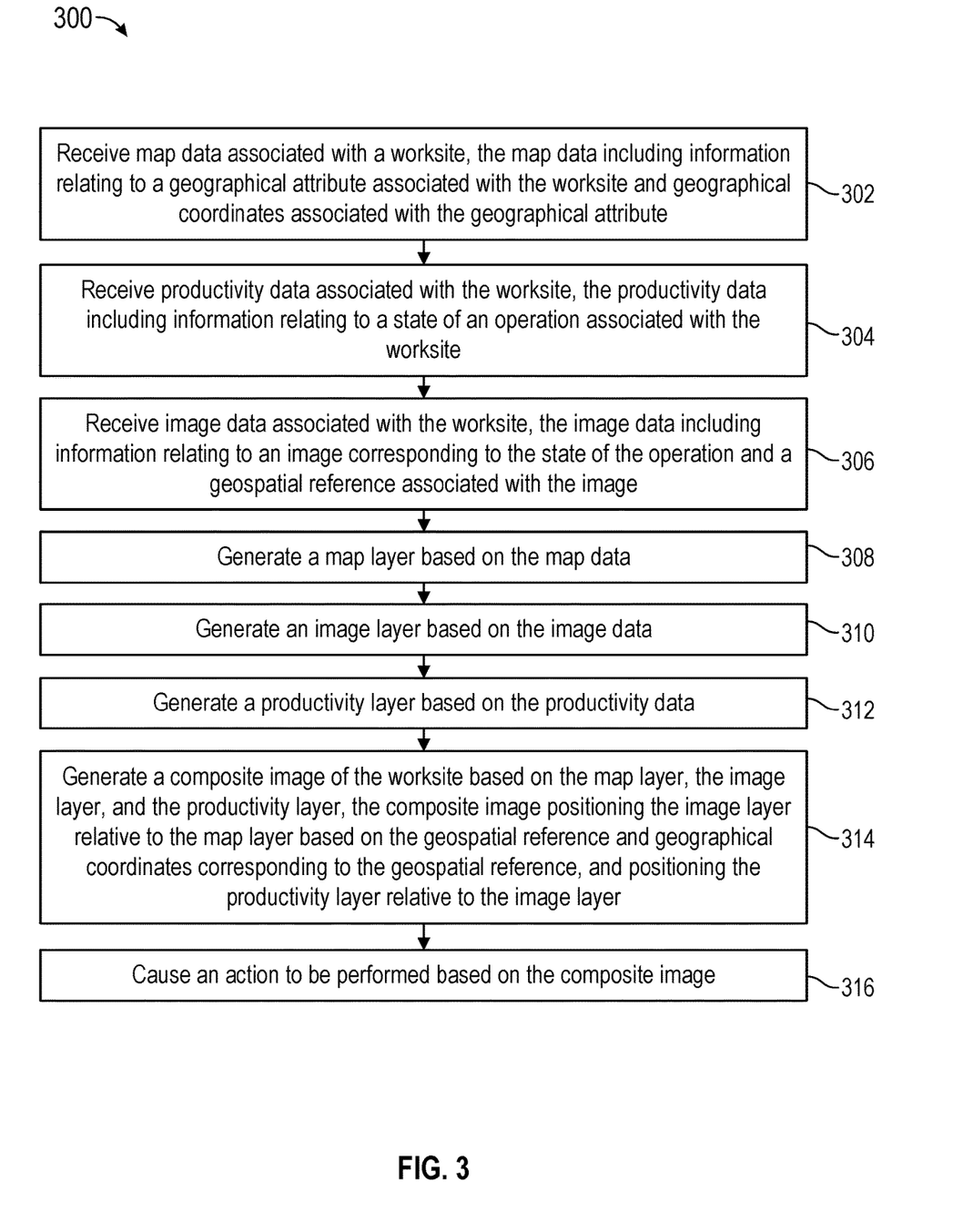
FIG. 3 is a flow chart of an example process for tracking productivity of an operation at a worksite.

FIG. 3 is a flow chart of an example process 300 for tracking productivity of an operation at a worksite. One or more process blocks of FIG. 3 may be performed by a management platform (e.g., management platform 106 of productivity tracking system 100) and/or by another component or a group of components separate from or including the management platform (e.g., imaging device 102, control unit 122 of work machine 104, control station 108, network storage device 110, and/or another device of productivity tracking system 100).

As shown in FIG. 3, process 300 may include receiving map data associated with a worksite, the map data including information relating to a geographical attribute associated with the worksite and geographical coordinates associated with the geographical attribute (block 302). For example, the management platform (e.g., using processor 136, memory 138, communication device 140, and/or the like) may receive map data associated with a worksite, as described above. The map data may include information relating to a geographical attribute associated with the worksite and geographical coordinates associated with the geographical attribute.

As further shown in FIG. 3, process 300 may include receiving productivity data associated with the worksite, the productivity data including information relating to a state of an operation associated with the worksite (block 304). For example, the management platform (e.g., using processor 136, memory 138, communication device 140, and/or the like) may receive productivity data associated with the worksite, as described above. The productivity data may include information relating to a state of an operation associated with the worksite.

As further shown in FIG. 3, process 300 may include receiving image data associated with the worksite, the image data including information relating to an image corresponding to the state of the operation and a geospatial reference associated with the image (block 306). For example, the management platform (e.g., using processor 136, memory 138, communication device 140, and/or the like) may receive image data associated with the worksite, as described above. The image data may include information relating to an image corresponding to the state of the operation and a geospatial reference associated with the image.

As further shown in FIG. 3, process 300 may include generating a map layer based on the map data (block 308). For example, the management platform (e.g., using processor 136, memory 138, communication device 140, and/or the like) may generate a map layer based on the map data, as described above.

As further shown in FIG. 3, process 300 may include generating an image layer based on the image data (block 310). For example, the management platform (e.g., using processor 136, memory 138, communication device 140, and/or the like) may generate an image layer based on the image data, as described above.

As further shown in FIG. 3, process 300 may include generating a productivity layer based on the productivity data (block 312). For example, the management platform (e.g., using processor 136, memory 138, communication device 140, and/or the like) may generate a productivity layer based on the productivity data, as described above.

As further shown in FIG. 3, process 300 may include generating a composite image of the worksite based on the map layer, the image layer, and the productivity layer, the composite image positioning the image layer relative to the map layer based on the geospatial reference and geographical coordinates corresponding to the geospatial reference, and positioning the productivity layer relative to the image layer (block 314). For example, the management platform (e.g., using processor 136, memory 138, communication device 140, and/or the like) may generate a composite image of the worksite based on the map layer, the image layer, and the productivity layer, as described above. The composite image may position the image layer relative to the map layer based on the geospatial reference and geographical coordinates corresponding to the geospatial reference, and position the productivity layer relative to the image layer.

As further shown in FIG. 3, process 300 may include causing an action to be performed based on the composite image (block 316). For example, the management platform (e.g., using processor 136, memory 138, communication device 140, and/or the like) may cause an action to be performed based on the composite image, as described above.

Process 300 may include variations and/or additional implementations to those described in connection with FIG. 3, such as any single implementation or any combination of implementations described elsewhere herein. Although FIG. 3 shows example blocks of process 300, in some examples, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

A worksite may include one or more work machines that are individually operated to perform a task and collectively managed to complete an operation according to a site plan. The operation may relate to construction, paving, demolition, mining, landscaping, forestry, pipelining, and/or another industrial application. The site plan may include specifications of the operation to be performed at the worksite that are designed based on an initial or a prior survey of the worksite. In some cases, a tracking tool may be used to track a progress of the operation relative to the site plan. The tracking tool may be updated intermittently, periodically, and/or continuously in real-time based on updated survey data (e.g., relating to structural and/or geographical changes within the worksite), productivity data (e.g., relating to a location and/or an operating condition of a work machine within the worksite), and/or other information that can be used to track the progress. In some cases, the tracking tool may provide a two-dimensional digital model and/or a three-dimensional digital model of the worksite that can be used to guide operators of the work machines. For instance, the tracking tool may be made accessible to remote operators and/or local operators via a mobile device, a control station, a display within a work machine, and/or another user interface.

In some cases, the tracking tool may provide a map view with images of the worksite indicating respective locations of a work machine, a stockpile, and/or another asset or attribute associated with the worksite. The respective locations of the assets and/or attributes within the worksite may be updated based on productivity data that is obtained and/or derived from information provided by the work machines. However, the images used to depict the worksite may be outdated (e.g., based on outdated satellite images), which can be inaccurate and/or misleading to an operator relying on the tracking tool. In some cases, an operator may use a drone with an imaging device to survey a worksite. For example, a drone can be used to capture an updated image of the worksite that can be used by the operator to visually assess a state of the worksite. However, a drone does not provide information (e.g., productivity data from work machines) that can be used to track the progress of an operation within the worksite. Accordingly, an operator may need to separately analyze information provided via a tracking tool and information provided via a drone to assess a state of a worksite. Using separate systems to analyze a single operation may result in errors, delays, inefficient use of work machines, and inefficient use of computational and/or network resources.

An image-based productivity tracking system described herein provides a single resource that leverages both updated image data and updated productivity data to track progress of an operation. For example, the image-based productivity tracking system may generate an image layer using updated image data received from an imaging device, generate a productivity layer using updated productivity data received from a work machine, and generate a composite image of the worksite based on the image layer and the productivity layer. The composite image may position the image layer relative to a map layer based on a geospatial reference associated with the image data and geographical coordinates associated with the map layer. The productivity layer may provide visual indications and/or annotations that index assets and/or attributes within the image layer. In some examples, the image-based productivity tracking system may enable manual and/or machine-based visual comparisons between successive composite images to determine the progress of an operation. In some examples, the image-based productivity tracking system may control an imaging device to intermittently, periodically, and/or continuously in real-time obtain updated images.

Accordingly, the image-based productivity tracking system described herein may enable both image-based and data-based tracking of a progress of an operation at a worksite. By overcoming a need to refer to multiple different systems to obtain image data and productivity data relating to progress of an operation, the image-based productivity tracking system conserves computational resources and/or network resources that may otherwise be needed to obtain such image data and productivity data. Additionally, because both image data and productivity data are processed by a single resource, the image-based productivity tracking system reduces ambiguities and opportunities for error that may otherwise occur when corroborating analyses from separate systems. The image-based productivity tracking system thereby enables operators to track the progress of an operation more accurately and in less time. The image-based productivity tracking system also enables operators to promptly identify and correct for errors or deviations from a site plan. Furthermore, the image-based productivity tracking system enables operations to be completed more efficiently, thereby conserving energy (e.g., fuel, gas, electricity, and/or the like) and reducing unnecessary wear of work machines.

What is claimed is:

1. A method, comprising:
    receiving, by a device, map data associated with a worksite,
        the map data including information relating to a geographical attribute associated with the worksite and geographical coordinates associated with the geographical attribute;
    receiving, by the device, productivity data associated with the worksite,
        the productivity data including information relating to a state of an operation associated with the worksite;
    receiving, by the device, image data associated with the worksite,
        the image data including information relating to an image corresponding to the state of the operation and a geospatial reference associated with the image;
    generating, by the device, a map layer based on the map data;
    generating, by the device, an image layer based on the image data;

generating, by the device, a productivity layer based on the productivity data,
  the productivity layer comprising an annotation, the annotation being based on comparing successive images of the operation at the worksite, identifying a visual difference between the successive images, and determining the state or a progress of the operation associated with the worksite by a computer vision model;
generating, by the device, a composite image of the worksite, the composite image including the map layer, the image layer, and the productivity layer,
  the composite image positioning the image layer relative to the map layer to correspond to the geospatial reference associated with the image layer with the geographical coordinates associated with the map layer, and positioning a visual indication of the productivity layer relative to the geospatial reference of the image layer or the geographical coordinates of the map layer;
generating, by the device, a record based on the composite image and a respective timestamp of the composite image;
transmitting, by the device and based on the composite image, a command signal to an imaging device to capture an updated image associated with the worksite;
obtaining, by the device, an updated productivity data corresponding to a change in the state or the progress of the operation associated with the worksite;
generating, by the device, an updated composite image based on the updated image and the updated productivity data;
generating, by the device, an updated record based on the updated composite image and a respective timestamp of the updated composite image;
generating, by the device, a catalog of the composite image and the updated composite image,
  the catalog indexing the composite image and the updated composite image based on the respective timestamps; and
controlling, by the device, an autonomous or semi-autonomous work machine based on the updated composite image.

2. The method of claim 1,
wherein the imaging device is an unmanned aerial vehicle, and
wherein the step of receiving the image data comprises:
receiving the image data from the imaging device,
  the imaging device being configured to capture the image, determine the geospatial reference associated with the image, generate the image data based on the image, and embed the geospatial reference into the image data.

3. The method of claim 1, wherein the step of receiving the productivity data comprises:
receiving the productivity data from one or more of the autonomous or semi-autonomous work machine, a control station, or a network storage device associated with the worksite,
  the productivity data including information relating to one or more of a measurement associated with the worksite, a measurement of a stockpile associated with the worksite, a productivity index of the operation, or a progress of the operation relative to a site plan associated with the worksite.

4. The method of claim 1, wherein the step of generating the image layer comprises:
converting the image data into a grid of one or more image tiles corresponding to the image,
  the one or more image tiles having respective geospatial references and being arranged according to the respective geospatial references, and
  the one or more image tiles corresponding to one or more map tiles of the map layer; and
generating the image layer based on the grid of the one or more image tiles.

5. The method of claim 1, wherein the step of generating the productivity layer comprises:
generating the visual indication associated with the productivity data,
  the visual indication including information relating to one or more of a location of the autonomous or semi-autonomous work machine associated with the worksite, a location of a stockpile associated with the worksite, or a location of a target work path associated with the worksite; and
generating the productivity layer based on the visual indication.

6. A device, comprising:
one or more memories; and
one or more processors, communicatively coupled to the one or more memories, configured to:
  receive productivity data associated with a worksite,
    the productivity data including information relating to a state of an operation associated with the worksite;
  receive image data associated with the worksite,
    the image data including information relating to an image corresponding to the state of the operation and a geospatial reference associated with the image;
  generate an image layer based on the image data;
  generate a productivity layer based on the productivity data;
    the productivity layer comprising an annotation, the annotation being based on comparing successive images of the operation at the worksite, identifying a visual difference between the successive images, and determining the state or a progress of the operation associated with the worksite by a computer vision model;
  generate a composite image of the worksite, the composite image including a map layer, the image layer, and the productivity layer,
    the map layer including information relating to a geographical attribute associated with the worksite and geographical coordinates associated with the geographical attribute, and
    the composite image positioning the image layer relative to the map layer to correspond the geospatial reference associated with the image layer with the geographical coordinates associated with the map layer, and positioning a visual indication of the productivity layer relative to the geospatial reference of the image layer or the geographical coordinates of the map layer;
  generate a record based on the composite image and a respective timestamp of the composite image;
  transmit, based on the composite image, a command signal to an imaging device to capture an updated image associated with the worksite;
  obtain an updated productivity data corresponding to a change in the state or the progress of the operation associated with the worksite;

generate an updated composite image based on the updated image and the updated productivity data;
generate an updated record based on the updated composite image and a respective timestamp of the updated composite image;
generate a catalog of the composite image and the updated composite image,
the catalog indexing the composite image and the updated composite image based on the respective timestamps; and
control an autonomous or semi-autonomous work machine based on the updated composite image.

7. The device of claim 6,
wherein the imaging device is an unmanned aerial vehicle, and
wherein the one or more processors, when receiving the image data, are configured to:
receive the image data from the imaging device,
the imaging device being configured to capture the image, determine the geospatial reference associated with the image, generate the image data based on the image, and embed the geospatial reference into the image data.

8. The device of claim 6, wherein the one or more processors, when generating the image layer, are configured to:
convert the image data into a grid of one or more image tiles corresponding to the image,
the one or more image tiles having respective geospatial references and being arranged according to the respective geospatial references, and
the one or more image tiles corresponding to one or more map tiles of the map layer; and
generate the image layer based on the grid of the one or more image tiles.

9. The device of claim 6, wherein the one or more processors, when generating the productivity layer, are configured to:
generate the visual indication associated with the productivity data,
the visual indication being indicative of one or more of a productivity index of the autonomous or semi-autonomous work machine, a measurement associated with the worksite, a location of a target work path associated with the worksite, a location of a stockpile associated with the worksite, a measurement of the stockpile, a productivity index of the operation associated with the worksite, or a progress of the operation relative to a site plan associated with the worksite; and
generate the productivity layer based on the visual indication.

10. The device of claim 6, wherein the one or more processors, when generating the composite image, are configured to:
overlay the image layer onto the map layer at geographical coordinates corresponding to the geospatial reference; and
overlay the productivity layer onto the image layer,
the productivity layer including location information associated with the productivity data, and
the productivity layer being positioned relative to the image layer based on the location information.

11. The device of claim 6, wherein the one or more processors are further configured to:
receive survey data including information relating to a site plan associated with the worksite;
generate a survey layer based on the survey data; and
generate the composite image of the worksite based on the map layer, the image layer, the productivity layer, and the survey layer,
the composite image positioning the survey layer relative to the image layer.

12. An autonomous or semi-autonomous work machine, comprising:
a sensing device, comprising at least a sensor, configured to provide productivity data of the autonomous or semi-autonomous work machine, the productivity data including information relating to a state of an operation associated with a worksite;
a display configured to display information relating to the state of the operation to an operator of the autonomous or semi-autonomous work machine; and
one or more processors configured to:
generate a productivity layer based on the productivity data,
the productivity layer comprising an annotation, the annotation being based on comparing successive images of the operation at the worksite, identifying a visual difference between the successive images, and determining the state or a progress of the operation associated with the worksite by a computer vision model;
generate an image layer based on image data,
the image data including information relating to an image corresponding to the state of the operation and a geospatial reference associated with the image,
generate a composite image of the worksite, the composite image including a map layer, the image layer, and the productivity layer,
the map layer including information relating to a geographical attribute associated with the worksite and geographical coordinates associated with the geographical attribute, and
the composite image positioning the image layer relative to the map layer to correspond the geospatial reference associated with the image layer with the geographical coordinates associated with the map layer, and positioning a visual indication of the productivity layer relative to the geospatial reference of the image layer or the geographical coordinates of the map layer,
generate a record based on the composite image and a respective timestamp of the composite image;
transmit, based on the composite image, a command signal to an imaging device to capture an updated image associated with the worksite;
obtain an updated productivity data corresponding to a change in the state or the progress of the operation associated with the worksite;
generate an updated composite image based on the updated image and the updated productivity data;
generate an updated record based on the updated composite image and a respective timestamp of the updated composite image;
generate a catalog of the composite image and the updated composite image,
the catalog indexing the composite image and the updated composite image based on the respective timestamps; and
control the autonomous or semi-autonomous work machine based on the updated composite image.

13. The autonomous or semi-autonomous work machine of claim 12, wherein the one or more processors are configured to, when generating the image layer:
convert the image data into a grid of one or more image tiles corresponding to the image,
the one or more image tiles having respective geospatial references and being arranged according to the respective geospatial references, and
the one or more image tiles corresponding to one or more map tiles of the map layer, and
generate the image layer based on the grid of the one or more image tiles.

14. The autonomous or semi-autonomous work machine of claim 12, wherein the one or more processors are configured to, when generating the productivity layer:
generate the visual indication associated with the productivity data,
the visual indication including information relating to one or more of a location of the autonomous or semi-autonomous work machine, a location of a stockpile associated with the worksite, or a location of a target work path associated with the worksite, and generate the productivity layer based on the visual indication.

15. The autonomous or semi-autonomous work machine of claim 12, wherein the one or more processors are configured to, when generating the composite image:
overlay the image layer onto the map layer at geographical coordinates corresponding to the geospatial reference, and
overlay the productivity layer onto the image layer,
the productivity layer including location information associated with the productivity data, and
the productivity layer being positioned relative to the image layer based on the location information.

16. The autonomous or semi-autonomous work machine of claim 12, further comprising:
the imaging device,
wherein the imaging device is configured to capture the image, determine the geospatial reference associated with the image, generate the image data based on the image, and embed the geospatial reference into the image data in a geospatially tagged image file format (GeoTIFF).

* * * * *